United States Patent [19]

Stjernholm

[11] Patent Number: 5,603,092
[45] Date of Patent: *Feb. 11, 1997

[54] METHOD FOR ESTIMATING C/I DENSITY AND INTERFERENCE PROBABILITY IN THE UPLINK

[75] Inventor: Paul Stjernholm, Stockholm, Sweden

[73] Assignee: Televerket, Farsta, Sweden

[ * ] Notice: The term of this patent shall not extend beyond the expiration date of Pat. No. 5,418,843.

[21] Appl. No.: 509,652

[22] Filed: Jul. 31, 1995

Related U.S. Application Data

[63] Continuation of Ser. No. 185,972, filed as PCT/SE93/00574, Aug. 18, 1992, published as WO94/05097, Mar. 3, 1994, abandoned.

[30] Foreign Application Priority Data

Aug. 18, 1992 [SE] Sweden ................................. 9202367

[51] Int. Cl.$^6$ ....................................................... H04B 15/00
[52] U.S. Cl. .......................... 455/63; 455/33.1; 455/67.1; 455/67.3
[58] Field of Search ................................. 455/33.1, 33.4, 455/53.1, 54.1, 56.1, 62, 63, 67.1, 67.3, 67.6; 379/59

[56] References Cited

U.S. PATENT DOCUMENTS 5,157,709  10/1992  Ohteru .................................. 455/56.1
5,197,722  1/1993  Gunmar et al. .......................... 455/67.3
5,418,843  5/1995  Stjernholm ............................. 455/33.1

OTHER PUBLICATIONS

"Mobile Cellular Telecommunication System" William Lee McGrall Hill, 1989 (pp. 386–389).

Primary Examiner—Andrew Faile
Assistant Examiner—Thanh Le
Attorney, Agent, or Firm—Oblon, Spivak, McClelland, Maier & Neustadt, P.C.

[57] ABSTRACT

The invention relates to a method for estimating the C/I density and interference probability in the uplink. According to the invention, two or more base stations synchronously measure signal strength and signal identity in the uplink in their own and each other's channels. By measuring over a sufficiently long time, a statistical basis for how the signal strengths from mobiles connected to a respective base station are distributed is obtained. From the basis, density functions for the signal strength from traffic to its own and, respectively, another station can be formed. Due to the synchronous measuring method, the functions can be normalized and a C/I or C/I+N density function can be formed, from which the interference probability can be calculated (FIG. 1).

3 Claims, 2 Drawing Sheets

METHOD FOR ESTIMATING C/I DENSITY AND INTERFERENCE PROBABILITY IN THE UPLINK

This application is a continuation of application Ser. No. 08/185,972, filed on Feb. 10, 1994, now abandoned, which is a Rule 371 of PCT Application No. PCT/SE93/00574, filed on Jun. 24, 1993, published as WO94/05097, Mar. 3, 1994.

FIELD OF THE INVENTION

The present invention relates to a method for calculating, by means of signal strength measurements in the uplink, how the traffic connected to a base station interferes with traffic connected to another base station. The method provides curves for C/I (carrier/interference) density and the interference probability can be calculated by this means.

PRIOR ART

For an operator of a mobile telephone network and the like, it is of interest to know the interference characteristics in the network. Having knowledge about the probability of interference, the operator can plan the capacity and quality of the network. It has previously been known to measure the signal strength in the downlink, that is to say measuring the signal strength from base station to mobile. Interference can be easily calculated from the coverage measurements taken when the signal strength has been measured from actual base stations.

However, it has been more difficult to estimate the interference in the uplink since it is caused by a fleet of mobiles which are continuously moving and where the position of an individual mobile station is unknown.

SUMMARY OF THE INVENTION

The present invention provides a method for estimating the C/I density and interference probability in the uplink, which method solves the abovementioned problem.

According to the invention, base stations synchronously measure signal strength and signal identity from mobiles on their own and each other's channels to form a statistical basis for how the signal strengths from mobiles connected to a respective base station are distributed. A density function (C) for the signal strength from traffic in the direction of its own base station and a density function (I) for the signal strength of traffic in the direction of another base station are formed from the basis. From these density functions, a density function for C/I can then be formed and the probability of interference calculated.

Other embodiments of the invention are specified in greater detail in the subsequent Patent Claims.

BRIEF DESCRIPTION OF THE DRAWINGS

The invention will now be described in detail with reference to the attached drawings, in which.

DETAILED DESCRIPTION OF A PREFERRED EMBODIMENT

Figure 1:
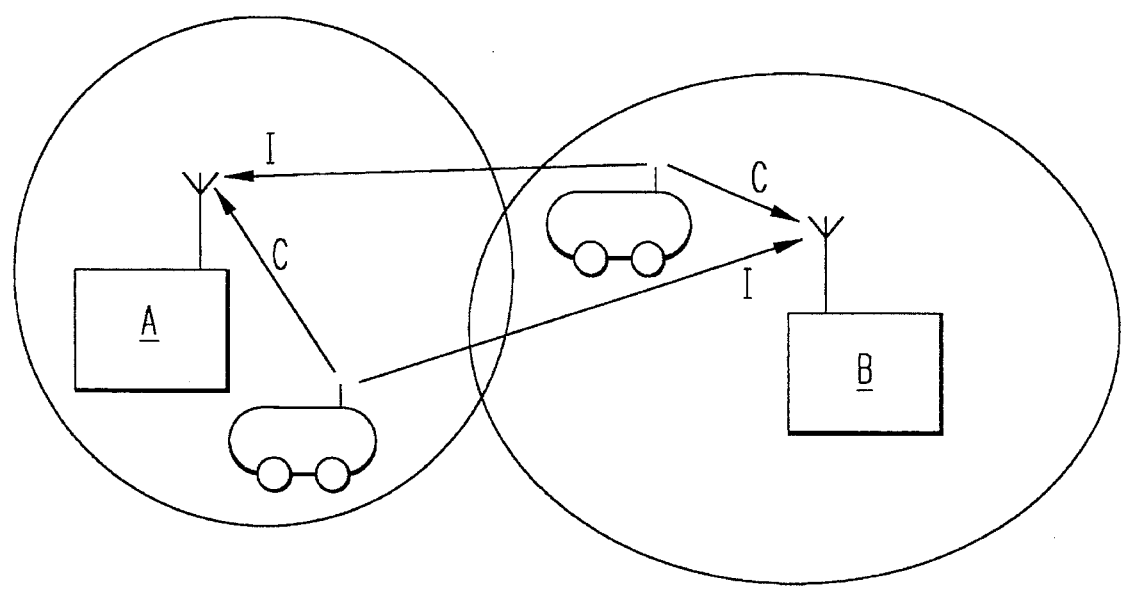
FIG. 1 is a diagrammatic figure of the measuring method according to the present invention.

As mentioned earlier, the method according to the invention is based on synchronous measurement of the signal strength in the uplink. The measuring method is shown diagrammatically in FIG. 1. The method is described for two base stations but can also be applied in the case where more than two base stations are included. Two base stations A, B thus measure the signal strength and signal identity from traffic in their own and each other's channels. A mobile which is connected to base station A generates a signal strength C at base station A and a signal strength I at base station B and vice versa for a mobile station within the area of base station B. By measuring over a sufficiently long time, a statistical basis is obtained for how the signal strengths from mobiles connected to a respective base station are distributed.

Figure 2:
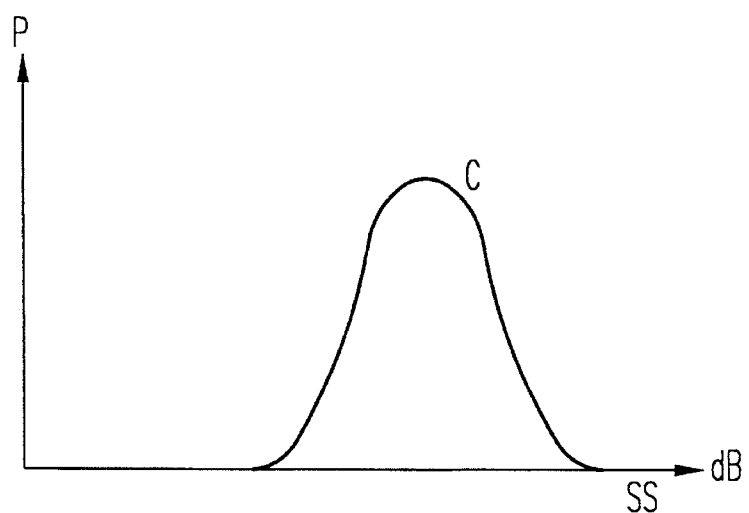
FIG. 2 shows an example of a C density curve obtained.

From the measured data, a number of measurement results per signal strength and channel can be obtained. The measurement result in their own channels, after normalisation with respect to the number of measurement results in their own channels, provides a density function for the signal strength from traffic in the direction of its own base. An example of such a curve is shown in FIG. 2.

Figure 3:
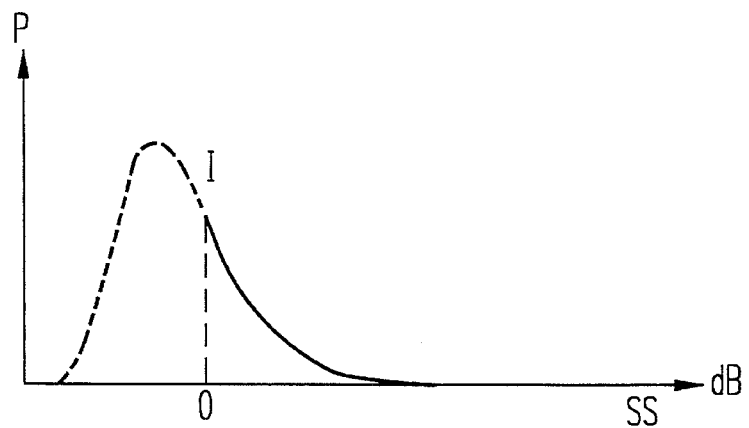
FIG. 3 shows an example of an I density curve obtained.

The measurement results on the channels of the second base station B normally only generate the upper part, "the tail", of the signal strength distribution from the traffic of the base since most of the signal strengths are below the noise level of the measurement equipment. FIG. 3 shows an example of a curve for interfering traffic I. The shape of the curve is thus only known down to a limit which is marked by 0 in the Figure. To obtain a correct density curve, a normalisation must be carried out with respect to the total traffic. Since the measurement is carried out synchronously at both base stations A and B, the total interfering traffic I is known since this is also measured by station B synchronously with A. By normalising the signal strength tail with the traffic in their own channels measured by station B, the density function for the part of the curve above the noise level 0 is thus obtained. It normally does not matter that the total signal strength density is not known since it is only the strong signal strengths, that is to say "the tail" which produces interference.

Figure 4:
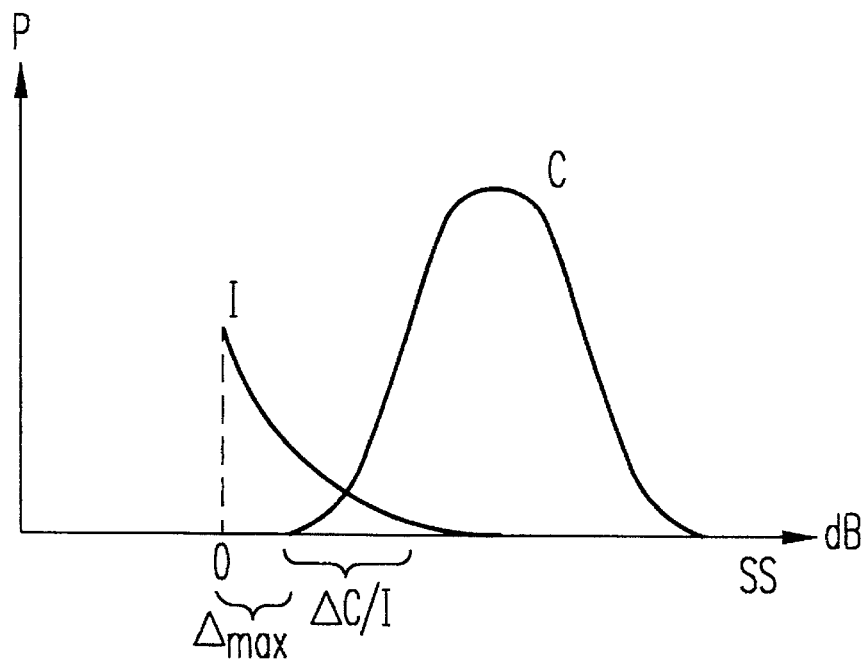
FIG. 4 is a combination of the curves C and I to illustrate the calculation of the C/I density.

From the abovementioned curves, the C/I density can be calculated. To illustrate this, both curves have been drawn in the same diagram in FIG. 4. Since the signal strength densities of their own and respectively the interfering base traffic $p_C(x)$ and, respectively, $p_I(x)$ are independent, the C/I density $p_{C/I}(x)$ for $x = \Delta C/I$ in the Figure can be calculated as $$p_{C/I}(\Delta C/I) = \sum_{k=-\infty}^{\infty} p_I(k - \Delta C/I) p_C(k)$$

where k represents the signal strength in dB.

Figure 5:
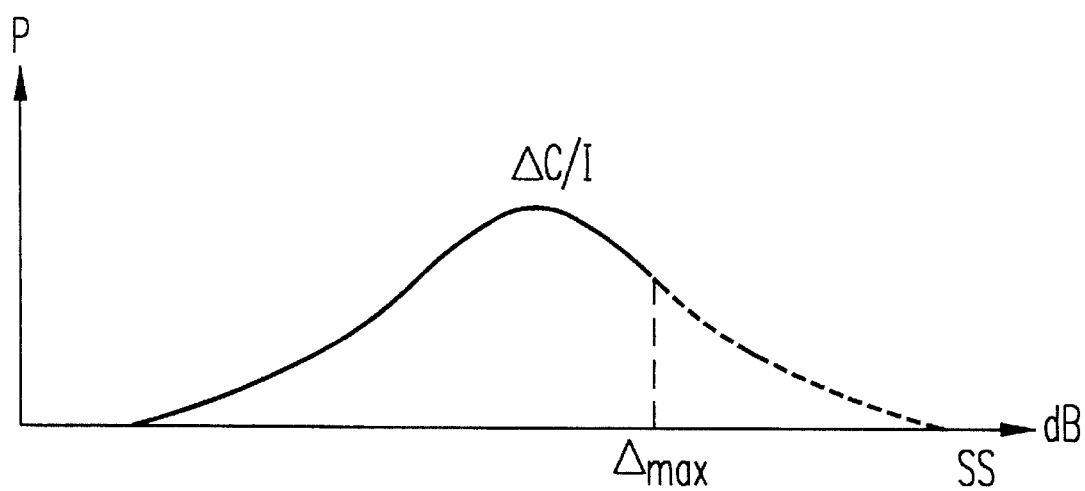
FIG. 5 is an example of a calculated C/I density curve.

For each $\Delta C/I$, a probability is obtained, which can be plotted in a new density curve for C/I. An example of such a curve is shown in FIG. 5. From this, the probability of interference being caused, that is to say that C/I is less than a specific value, can be calculated as $$P_{C/I}(k \leq C/I_{max}) = \sum_{k=-\infty}^{C/I_{max}} p_{C/I}(k)$$

The curve is not known for a $\Delta C/I$ greater than a given value $\Delta_{max}$ since there is the abovementioned limit for small values in the I curve above. However, this has no significance since this part of the curve provides large values of ΔC/I and therefore low interference.

Conditional probabilities can also be calculated on the basis of the measured data. In calculating the interference probability, the traffic handling per base station, channel or channel group and variations with time can also be taken into consideration.

Special attention must be paid when the measurement is carried out on base stations which utilise the same channels since in this case only the common-channel interference can be measured when their own traffic is not carried in the channel.

The synchronous measuring method according to the present invention thus provides a novel tool for planning and operation of a mobile telephone network or the like. The invention is only limited by the Patent Claims below.

I claim:

1. A method of determining carrier (C) to interference (I) density and interference probability at base stations in a multiple base station cellular telephone system during uplink transmission to the base stations from plural mobile stations, wherein each base station serves a respective service area, comprising the steps of:

(a) transmitting from first and second mobile stations radio signals to a first base station serving the first mobile station in a first service area and simultaneously to a second base station serving the second mobile station in a second service area, respectively;

(b) synchronously measuring at said first and second base stations respective carrier signals (C) and respective interference signals (I);

(c) normalizing data indicative of the carrier signal (C) and the interference signal (I) at each base station;

(d) repeating steps (a), (b) and (c) for transmissions of said radio signal in plural service areas of respective base stations by plural mobile stations and for synchronous measuring and normalizing of the data indicative of carrier signal (C) and interference signal (I) at each base station;

(e) determining a density function of carrier signals (C) produced from radio signals originating from transmissions within the service area of each base station;

(f) determining a density function of interference signals (I) produced from radio signals originating from transmissions outside the service area of each base station; and, (g) determining a probability of interference being caused by reception in a base station of the interfering signals originating out of the service area of the respective base stations based on a ratio (C/I) of the density function determined in step (e) to the density function determined in step (f).

2. A method as in claim 1 wherein said step c), normalizes the data above a measured noise level of the device measuring the respective signal strengths.

3. A method as in claim 2 further comprising the step of: integrating the C/I density function.

* * * * *

UNITED STATES PATENT AND TRADEMARK OFFICE
CERTIFICATE OF CORRECTION

PATENT NO. : 5,603,092
DATED : February 11, 1997
INVENTOR(S) : Paul STJERNHOLM

It is certified that error appears in the above-indentified patent and that said Letters Patent is hereby corrected as shown below:

On the Title page, item [63] Related U.S. Application Data should read--

Continuation of Ser. No. 185,972, filed as PCT/SE93/00574, June 24, 1993, published as WO94/05097, March 3, 1994, abandoned. --

Signed and Sealed this

Fifth Day of August, 1997

Attest:

BRUCE LEHMAN

Attesting Officer

Commissioner of Patents and Trademarks